3,081,313
BISPHENOLS AND PROCESS THEREFOR
Louis B. Conte, Jr., Newark, and Francis N. Apel, Nutley, N.J., assignors to Union Carbide Corporation, a corporation of New York
No Drawing. Filed Apr. 14, 1960, Ser. No. 22,135
8 Claims. (Cl. 260—395)

This invention relates to aryl substituted bisphenols and process for producing the same. More particularly, the invention relates to aryl substituted bisphenols produced from aryl acetylenes and phenols and process for producing such bisphenols.

Bisphenols have not heretofore been produced from diaryl acetylenes and phenols. It is known, however, to prepare bisphenols from phenols and acyclic $C_3H_4$ compounds and from phenols and ketones. Methods presently known to the art for condensing hydroxyaryl compounds, such as phenols with hydrocarbon compounds, such as acyclic $C_3H_4$ compounds or ketones such as acetophenone involve generally the reaction of the two compounds in the presence of an acidic condensing agent. Two types of condensing agents presently used are the Friedel-Crafts type catalyst, e.g., the halides of boron, zinc, iron and tin, and the mineral acid type such as sulfuric acid, phenol-sulfonic acid and hydrofluoric acid. These processes require as condensing agent an acid which does not form an insoluble, noncatalytically active complex with either reactant under conditions of the condensation. Aluminum chloride, however, when in contact with phenol forms an insoluble complex with the result that the aluminum chloride fails to catalyze the reaction of hydrocarbon therewith. Also water formed in the course of the phenol-ketone reaction adversely affects the rate of product formation. These methods have a number of other undesirable features in addition to limitations on the catalyst in certain condensations. Among these are (1) complicated and expensive washing steps to ensure complete removal of catalyst residues from the crystalline product; (2) the necessity of corrosion resistant equipment for separating the crystalline product from recycled phenol and catalyst; (3) requirement of elaborate means to ensure against loss or destruction of the soluble catalyst in the recycled stream; (4) necessity of recycling the catalyst with recycled phenol; and (5) slow reaction rates and expensive dehydration steps where water is a co-product of the reaction.

It is an object therefore of the present invention to provide process for condensing hydroxyaryl compounds and aryl acetylenes which avoids the limitations and product separation difficulties of heretofore known condensation processes.

It is another object to provide novel bisphenol compounds by the condensation of diaryl acetylenes and hydroxyaryl compounds.

We have now discovered that hydroxyaryl compounds are condensed with aryl acetylenes to produce bisphenols by contacting under substantially anhydrous conditions a mixture of an aryl acetylene and a phenol wherein the phenol is present in an amount in excess of stoichiometric proportions, with a substantially insoluble cation exchange resin at a temperature from about 30° C. to 125° C. to effect interreaction between the phenol and at least a part of the aryl acetylene, separating from the reaction zone the effluent containing the aryl substituted bisphenol, reaction by-products, and some free phenol and isolating the reaction by-products and the aryl-substituted bisphenol therefrom, and if desired, recycling the reaction by-products and the phenol to the reaction zone.

Novel bisphenols, 1,1-bis(hydroxyaryl)-1,2-(diaryl) ethanes, are obtained by reacting together diaryl acetylenes and hydroxyaryl compounds in accordance with the method herein set forth.

Surprisingly, this catalyst is highly active despite its being an insoluble phenol complex under the reaction conditions. Hence, the catalyst is to be sharply distinguished from the insoluble phenol-complexed acidic condensing agents heretofore known such as aluminum chloride-phenol complexes which exhibit no catalytic effect, and known soluble noncomplex type catalysts such as Friedel-Crafts catalysts and mineral acid catalysts.

The size and dimensions of the reaction zone are not critical, provided adequate contact of the reactants with the cation exchanging resin is obtained. Suitable reaction zones, for example, are those of enlarged cross-sections such as a chamber, tank, autoclave or the like and those of restricted cross-sections such as a tubular reactor and coil or the like. A plurality of reaction zones connected for series or parallel flow can be employed. Suitably the reaction zone is equipped with means for maintaining or adjusting the temperature within the reaction zone and means for preventing entrainment of the catalyst in the effluent.

The time of residence of the aryl acetylene and phenol in the reaction zone can vary considerably within the scope of the present invention depending upon the specific molar ratio of the reactants, the amount and type of cation exchanging catalyst employed, temperatures used, percent conversion desired, etc. Residence time, as a minimum, is the time sufficient to initiate the reaction and, as a maximum, the time sufficient to substantially complete interreaction between the reactants present. We prefer a 20% conversion of reactants as a minimum and an 80% conversion as a maximum. We particularly prefer a conversion of about 50%, since at increased conversions the reaction rate declines and the process becomes increasingly less economical in terms of amount of product per unit time. No particular residence time is critical in the present invention with regard to yield, the same high yields being obtained with comparatively short contact times and low conversions as are achieved with long contact times and high conversions. Contact times of as little as one hour and a conversion of about 50% is the most desirable, since they provide yields of about 99% of the theoretical, based on the aryl acetylene consumed, of bisphenol having high purity.

The aryl acetylenes useful in the product of aryl-substituted bisphenols in accordance with the present invention are acetylenically unsaturated hydrocarbons having substituted thereon one or two aryl groups or lower alkyl substituted aryl groups having from six to about ten carbon atoms, e.g., phenyl acetylene, diphenyl acetylene, o-cresyl acetylene, di-xylyl acetylene and the like. These aryl acetylenes have the general formula $$R^1-C\equiv C-R^2$$

wherein $R^1$ is a member selected from the group consisting of hydrogen, phenyl and lower alkyl substituted phenyl groups and $R^2$ is a member selected from the group consisting of phenyl and lower alkyl substituted phenyl groups. The term "aryl acetylene" is intended to encompass both mono- and diaryl acetylenes.

Phenols useful in the present process are hydroxy-substituted aryl compounds having a reactive and substantially stearically unhindered hydrogen in the ring position para to the phenolic hydroxyl. Such phenols can have one or more lower alkyl or halogen substituents in the ring positions ortho and meta to the phenolic hydroxyl, e.g., o- and m-cresol; 2,6-dimethylolphenol; m-xylenol; tetra-methylolphenol; 2-methyl-6-t-butylphenol and the like; o- and m-chlorophenol; and 2,6-dichlorophenol and like halogenated phenols.

The process of our invention is preferably carried out with an amount of a phenol in excess of stoichiometric quantities, i.e., more than 2 moles of phenol per mole of aryl acetylene present in the reaction zone, and preferably between about 3 to 20 moles of phenol per mole of aryl acetylene. The higher molar ratios of phenol to the aryl acetylene compound, i.e., about 12:1 or more are desirable where the temperature of the reaction zone is comparatively low since this ratio will inhibit clogging of the reaction zone with solidified reaction products or crystallized adducts of phenol with the reaction products. A molar ratio of 6:1 to 12:1 of phenol to aryl acetylene compound is particularly preferred. At a conversion of 50% based on the aryl acetylene compound consumed, a phenol-to-aryl acetylene ratio of 10:1 is particularly preferred. While minor amounts of substantially inert solvents, such as pentane, cyclohexane or benzene do not completely inhibit the reaction, they do complicate the separation steps in the process and their presence is not particularly desirable.

It is essential in order to maintain high rates of aryl-substituted bisphenol formation in batch, semi-continuous or continuous operation that substantially anhydrous reactants, i.e., containing less than 2% water by weight, be fed to the reaction zone, since the overall efficiency of the process of the invention is dependent upon the presence of less than 2% of water in the reaction zone for optimum catalysis with the cation exchange resins.

The temperature within the reaction zone should be such as will maintain the reactants in the liquid phase. In general, the lower the temperature employed in the reaction zone, the lower the concentration of aryl-substituted bisphenol. The use of temperatures which are so high as to cause degradation of the reactants, the aryl-substituted bisphenol or the cation exchange resin, or which cause an undue rate of by-product formation is to be avoided. The specific temperature employed can vary from about 30° C. to 125° C. depending upon the other operating conditions, within the reaction zone, such as a percent conversion per pass, residence time or length of time of contact betweeen catalyst and reactants, pressure and the like. In order to avoid plugging of the reaction zone with solidified reaction products, which may occur at temperatures much below 40° C. and in order to achieve reasonable rates of conversion to aryl-substituted bisphenol, temperatures preferably range from about 40° C. to about 100° C.

Optimum results both as regards rate of reaction and yield are obtained by the use of temperatures within the range of 70° C. to 80° C., and these temperatures are, therefore, particularly preferred. The reaction zone can be at atmospheric, sub-atmospheric or super-atmospheric pressure. It is also within the scope of our invention to employ an inert atmosphere within the reaction zone. In general, the use of atmospheric pressure or a slightly elevated pressure is preferred to ensure adequate flow of materials through the system in continuous operations.

It is another advantage of our process that super-atmospheric pressure is not required in the reaction zone to maintain catalyst concentration at the desired level during operation as must be done with heretofore known processes which employ gaseous or volatile mineral acid catalysts and sometimes gaseous or volatile catalyst promoters.

We employ cation exchange resins as solid catalysts in the continuous process of our invention. These resins are insoluble in the reaction mixture and hence the problem of catalyst separation from the reaction zone effluent and the removal of small amounts of catalyst impurities in the product is obviated. Throughout the reaction steps and isolation steps the catalyst remains in the reaction zone and does not appear elsewhere in the process equipment. Its service life in this process is nearly infinite; it does not of necessity have to be regenerated, if care is exercised in preventing the introduction of basic metal ions such as sodium, potassium, calcium, etc., or other contaminants which inactivate the ion exchanging groups of the resin. The use of the insoluble catalyst confers the additional advantages of (1) eliminating the need for acid corrosion resistant equipment which is otherwise essential and (2) making unnecessary the neutralization steps which are common to other processes.

The ion exchange resins useful in our process are substantially insoluble polymeric skeletons with acidic cation exchanging groups chemically bound thereto. The exchange potential of the bound acidic groups and the number of them which are available for contact with the phenol-aryl acetylene reaction mixture determine the catalytic effectiveness of a particular cation exchange resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur only on the surface of the cation exchange resin; therefore, a form of resin which provides a maximum amount of surface area, e.g., porous microspheres or beads, is highly desirable and affords the highest rate of reaction and reaction economy in this process. The particular form of the cation exchange resin used, however, is not critical.

The ion exchange resins used should be substantially insoluble in the reaction mixture and in any solvent to which the resin may be exposed in service. Resin insolubility is generally due to a high degree of cross-linking within the resin but can be caused by other factors, e.g., high molecular weight or a high degree of crystallinity.

In general, the greater the exchange capacity of a resin, i.e., the greater the number of milliequivalents of acid per gram of dry resin, the more desirable the resin is for use in our process. Resins having an exchange capacity greater than about two milliequivalents of acid per gram of dry resin are preferred. Particularly preferred are resins with bound cation exchanging groups of the stronger exchange potential acids; results obtained with bound sulfonic acid groups have been highly satisfactory. Among the ion exchange resins which are highly suited to use in our process are: sulfonated styrene-divinylbenzene copolymers, sulfonated cross-linked styrene polymers, phenol formaldehyde sulfonic acid resins, benzene-formaldehyde-sulfonic acid resins, and the like. Most of these resins and many others are available commercially under trade names such as: Amberlite XE–100 (Rohm and Haas Co.); Dowex 50–X–4 (Dow Chemical Co.); Permutit QH (Permutit Co.); and Chempro C–20 (Chemical Process Co.).

Many ion exchange resins are received from the manufacturer in the form of the sodium or other salt and must be converted to the hydrogen or acid form prior to use in this process. The conversion can be easily accomplished by washing the resin with a solution of a suitable mineral acid e.g., sulfuric, hydrofluoric or hydrochloric acids. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. Substantially all this water, i.e., all but about 2% as a maximum must be removed prior to use of the cation exchange resin in our process. Suitable methods for removing the water in the resin include drying the resin under reduced pressure in an oven; soaking the resin in melted anhydrous phenol for a time sufficient to fill the resin interspaces with phenol; and azeotropic distillation of water and phenol in the presence of an excess of phenol.

The resin when once conditioned in this manner to insure anhydrous conditions throughout does not require reconditioning at any time during use in the process. Alternatively, the catalyst can be conditioned after installation in the process equipment merely by running the reaction mixture through the catalyst until substantially all water is removed. In this latter procedure conditioning is accomplished by the phenol.

Remarkable efficiencies and economies per pound of catalyst are made possible by the use of these solid cation exchange resins. Experimental runs have shown that the resins remain catalytically effective for indefinite periods. Many pounds of 1,1-bis(hydroxyaryl)1,2-diaryl ethane can be produced per pound of resin without any sign of the catalytic effectiveness abating. Thus, with the above-described resins a process can be run continuously and automatically with no problems of catalyst regeneration.

The amount of catalyst used can be varied over a wide range with commensurate rates of reaction and product yield. Concentrations of catalyst ranging from about 0.01 to about 0.5 acid equivalent per mole of phenol are preferred. Lower concentrations provide less rapid reaction rates and higher concentrations somewhat reduced yields. Catalyst concentrations ranging from about 0.02 to about 0.3 acid equivalent per mole of phenol have given excellent results and are particularly preferred.

A catalyst concentration of about 0.20 acid equivalents per mole of phenol provides the optimum combination of reaction rate, yield and product quality and is the most desirable concentration when operating at temperatures between about 70° C. and 80° C. with a 10:1 ratio of phenol to the aryl acetylene.

The reaction is initiated in semi-continuous or continuous operation by passing a mixture of both substantially anhydrous phenol and substantially anhydrous aryl acetylene, i.e., less than 2% by weight water content, and preferably anhydrous, i.e., less than 0.2% by weight water content, heated to reaction temperature into a fixed bed of cation exchange resin. The reactants are preferably passed downward, at a slight positive pressure to maintain an adequate rate of flow through the bed, although gravity flow and upward flow is satisfactory. In conducting batch reactions, the aryl acetylene is added below the liquid level to an agitated mixture of phenol and cation exchange resin.

Product separation is effected suitably by distilling the effluent removed from the catalyst to drive off substantially all the phenol. Desirably the distillation is carried out under reduced pressures. Distillation at 1 mm. Hg pressure to a final residue temperature of 200° C. or thereabouts is preferred for removing the phenol. The crude product thus obtained is recrystallized from toluene or cyclohexane or similar inert liquid organic solvent.

If desired the distilled phenol and reaction by-products can be recycled to the reaction zone in a continuous manner. Surprisingly, we have found that an equilibrium is thereby maintained between the product and the by-products in the reactor such that under steady state recycle conditions the concentration of by-products in the reactor remains constant. Consequently, no further build-up of by-products results, and high process efficiencies of 99 percent and above are realized.

*Examples 1–19*

The procedure used is exemplified by Example 1. Examples 2–19 were similarly conducted except for variations indicated in the example itself.

*Example 1*

A one-liter flask equipped with stirrer, thermometer and dropping funnel was used. There was placed in the flask 564 grams (6 moles) of molten phenol and 250 grams (0.875 acid equivalent) of cation exchange resin catalyst prepared by saturating with phenol in the manner indicated above. The mixture was stirred for 0.5 hour at 75° C. during which period 51 grams (0.5 mole) of phenyl acetylene was added dropwise. Some cooling was required to maintain the temperature at 75° C. After the addition was completed, stirring was continued at 75° C. for an additional 4.5 hours. The mixture was filtered and the catalyst washed on the filter with approximately 250 grams of molten phenol. The filtrate and washings were combined and distilled at reduced pressures to a final residue temperature of 200° C. at 1 mm. Hg pressure. The residue was crude bisphenol product and weighed 120 grams representing an 83% yield based on phenyl acetylene added. Recrystallization from an equal weight of toluene resulted in 75 grams of pure crystalline 1,1-bis(4-hydroxyphenyl)1-phenyl ethane, having a melting point of 186° C.; percent hydroxyl was 11.7. Yield was 53% based on phenyl acetylene.

The data of Examples 2–19 are presented in the table below.

| Example | Mole Ratio: phenol/phenyl acetylene | Temp., °C. | Ratio: Eq. Cat./Mole Phenol | Reaction Time (hrs.) | Crude Yield | Pure Bisphenol, Percent |
|---|---|---|---|---|---|---|
| 2 | 4/1 | 75 | 0.44 | 5 | 72 | 36 |
| 3 | 10/1 | 75 | 0.175 | 5 | 73 | 51 |
| 4 | 10/1 | 75 | 0.146 | 5 | 83 | 53 |
| 5 | 10/1 | 55 | 0.175 | 5 | 76 | 50 |
| 6 | 10/1 | 75 | 0.175 | 5 | 73 | 51 |
| 7 | 10/1 | 100 | 0.175 | 5 | 89 | 40 |
| 8 | 10/1 | 55 | 0.088 | 5 | 70 | 20 |
| 9 | 10/1 | 75 | 0.088 | 5 | 75 | 24 |
| 10 | 10/1 | 100 | 0.088 | 5 | 70 | 26 |
| 11 | 10/1 | 75 | 0.176 | 5 | 73 | 51 |
| 12 | 10/1 | 75 | 0.088 | 5 | 76 | 24 |
| 13 | 10/1 | 75 | 0.044 | 5 | 72 | 15 |
| 14 | 10/1 | 75 | 0.022 | 5 | 60 | 5 |
| 15 | 10/1 | 100 | 0.175 | 1 | 70 | 37 |
| 16 | 10/1 | 100 | 0.175 | 5 | 80 | 40 |
| 17 | 10/1 | 75 | 0.175 | 1 | 70 | 33 |
| 18 | 10/1 | 75 | 0.175 | 5 | 73 | 51 |
| 19 | 10/1 | 75 | 0.175 | 20 | 77 | 31 |

Examination of the table indicates that excellent crude yield and pure product yield are obtained using a 10:1 molar ratio of phenol and phenyl acetylene. An increase in temperature at a mole ratio of 10:1 from 55° C. to a preferred 75° C. increases both crude product yield and pure product yield (Examples 8 and 9); but a further increase in temperature to 100° C. provides lowered crude product yield, although containing a higher percentage of pure product (Example 10). Increased catalyst concentration, up to 0.175 equivalent of catalyst per mole of phenol, provides increased yield of both crude and pure product (Examples 11–14).

*Example 20*

One-hundred grams of toluene extractables from crude product was dissolved in 470 grams of phenol and heated at 75° C. for 24 hours in contact with 0.175 acid equivalent of catalyst per mole of phenol. Yield of crude product was 100% of which 10% was pure bisphenol.

*Example 21*

A one liter flask equipped with stirrer and thermometer was used. There was first prepared a mixture of 20 grams (0.11 mole) of diphenyl acetylene and 105 grams (1.1 moles) of phenol. The mixture was heated until a clear solution was obtained and the heated mixture was added to the flask into which had been placed 56 grams (0.175 acid equivalent) of cation exchange resin catalyst prepared by saturating with phenol in the manner indicated above. The catalyst and reactant mixture were stirred together for five hours at 75° C. The mixture was filtered and the catalyst washed on the filter with approximately 250 grams of molten phenol. The filtrate and washings were combined and distilled at reduced pressures to a final residue temperature of 200° C. at 1 mm. Hg. pressure. Yield of crude product was 70% of which, after toluene recrystallization, 25% was pure 1,1-bis(4-hydroxyphenyl)1,2-diphenyl ethane (M.P. 222°–223° C.). Theoretical hydroxyl analysis for

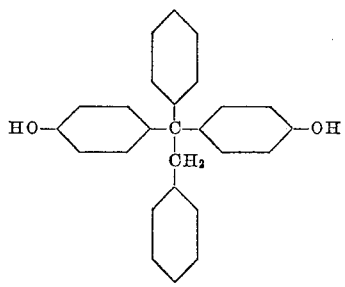

is 9.28%. Actual hydroxyl found 9.28%.

What is claimed is:

1. A process for the production of 1,1-bis(hydroxyaryl)aryl ethanes which includes the steps of contacting a mixture comprising aryl acetylene having the formula $$R^1-C\equiv C-R^2$$

wherein $R^1$ is selected from the group consisting of hydrogen, phenyl and lower alkyl substituted phenyl groups and $R^2$ is selected from the group consisting of phenyl and lower alkyl substituted phenyl groups, and a stoichiometric excess of a phenol in a reaction zone maintained at a temperature of from about 30° C. to about 125° C. with from 0.01 to about 0.5 acid equivalent per mole of phenol of a substantially insoluble cation exchange resin, maintaining said mixture in said reaction zone for a period sufficient to effect the interreaction of at least a part of said aryl acetylene with said phenol, thereby forming a product mixture comprising 1,1-bis(hydroxyaryl)aryl ethane, reaction by-products and phenol, withdrawing said product mixture from said reaction zone and separating the 1,1-bis(hydroxyaryl)aryl ethane formed.

2. A process for the production of 1,1-bis(hydroxyaryl)aryl ethanes which includes the steps of contacting a mixture comprising aryl acetylene having the formula $$R^1-C\equiv C-R^2$$

wherein $R^1$ is selected from the group consisting of hydrogen, phenyl and lower alkyl substituted phenyl groups and $R^2$ is selected from the group consisting of phenyl and lower alkyl substituted phenyl groups, and from 3–20 moles of a phenol per mole of aryl acetylene in a reaction zone containing less than 2 percent by weight of water and maintained at a temperature of from about 40° C. to about 100° C. with from 0.02 to 0.3 acid equivalent per mole of phenol of a substantially insoluble cation exchange resin, maintaining said mixture in said reaction zone for a period sufficient to effect the interreaction of at least a part of said aryl acetylene with said phenol, thereby forming a product mixture comprising 1,1-bis(hydroxyaryl)aryl ethane, reaction by-products and phenol, withdrawing said product mixture from said reaction zone and separating the 1,1-bis(hydroxyaryl)aryl ethane formed.

3. A process for the production of 1,1-bis(hydroxyaryl)aryl ethanes which includes the steps of contacting a mixture comprising aryl acetylene having the formula $$R^1-C\equiv C-R^2$$

wherein $R^1$ is selected from the group consisting of hydrogen, phenyl and lower alkyl substituted phenyl groups and $R^2$ is selected from the group consisting of phenyl and lower alkyl substituted phenyl groups, and from 6–12 moles of a phenol per mole of aryl acetylene in a reaction zone maintained at a temperature of from about 70° C. to about 80° C. with from 0.02 to about 0.3 acid equivalent per mole of phenol of a substantially insoluble cation exchange resin, maintaining said mixture in said reaction zone for a period sufficient to effect the interreaction of at least a part of said aryl acetylene with said phenol, thereby forming a product mixture comprising 1,1-bis(hydroxyaryl)aryl ethane, reaction by-products and phenol, withdrawing said product mixture from said reaction zone and separating the 1,1-bis(hydroxyaryl)aryl ethane formed.

4. A process for the production of 1,1-bis(hydroxyaryl)aryl ethanes which includes the steps of contacting a mixture comprising aryl acetylene having the formula $$R^1-C\equiv C-R^2$$

wherein $R^1$ is selected from the group consisting of hydrogen, phenyl and lower alkyl substituted phenyl groups and $R^2$ is selected from the group consisting of phenyl and lower alkyl substituted phenyl groups, and 10 moles of a phenol per mole of aryl acetylene in a reaction zone maintained at a temperature of from about 70° C. to about 80° C. with about 0.20 acid equivalent per mole of phenol of a substantially insoluble cation exchange resin, maintaining said mixture in said reaction zone for a period sufficient to effect the interreaction of at least a part of said aryl acetylene with said phenol, thereby forming a product mixture comprising 1,1-bis(hydroxyaryl)aryl ethane, reaction by-products and phenol, withdrawing said product mixture from said reaction zone and separating the 1,1-bis(hydroxyaryl)aryl ethane formed.

5. A process for the production of 1,1-bis(4-hydroxyphenyl) 1,2-diphenyl ethane which includes the steps of contacting a mixture comprising diphenyl acetylene and a stoichiometric excess of phenol in a reaction zone maintained at a temperature of from about 30° C. to about 125° C. with from 0.01 to about 0.5 acid equivalent per mole of phenol of a substantially insoluble cation exchange resin, maintaining said mixture in said reaction zone for a time sufficient to effect the conversion of from 20% to 80% of said diphenyl acetylene and said phenol, thereby forming a product mixture comprising 1,1-bis-(4-hydroxyphenyl) 1,2-diphenyl ethane, reaction by-products and phenol, withdrawing said product mixture from said reaction zone and separating the 1,1-bis(4-hydroxyphenyl) 1,2-diphenyl ethane formed.

6. A process for the production of 1,1-bis(4-hydroxyphenyl) 1,2-diphenyl ethane which includes the steps of contacting a mixture comprising diphenyl acetylene and from 3–20 moles of phenol per mole of diphenyl acetylene in a reaction zone maintained at a temperature of from about 40° C. to about 100° C. with from 0.02 to about 0.3 acid equivalent per mole of phenol of a substantially insoluble cation exchanging resin, maintaining said mixture in said reaction zone for a time sufficient to effect the conversion of from 20% to 80% of said diphenyl acetylene in said phenol, thereby forming a product mixture comprising 1,1-bis(4-hydroxyphenyl) 1,2-diphenyl ethane, reaction by-products and phenol, withdrawing said product mixture from said reaction zone and separating the 1,1-bis(4-hydroxyphenyl) 1,2-diphenyl ethane formed.

7. A process for the production of 1,1-bis(4-hydroxyphenyl) 1,2-diphenyl ethane which includes the steps of contacting a mixture comprising diphenyl acetylene and 10 moles of phenol per mole of diphenyl acetylene in a reaction zone maintained at a temperature between 55° C. and 60° C. with about 0.20 acid equivalent per mole of phenol of a substantially insoluble cation exchanging resin, maintaining said mixture in said reaction zone for a time sufficient to effect the conversion of about 50% of said diphenyl acetylene and said phenol, thereby forming a product mixture comprising 1,1-bis(4-hydroxyphenyl) 1,2-diphenyl ethane, reaction by-products and phenol, withdrawing said product mixture from said reaction zone and separating the 1,1-bis(4-hydroxyphenyl) 1,2-diphenyl ethane formed.

8. 1,1-bis(4-hydroxyphenyl) 1,2-diphenyl ethane.

(References on following page)

References Cited in the file of this patent

UNITED STATES PATENTS

| | | |
|---|---|---|
| 1,707,941 | Nieuwland | Apr. 2, 1929 |
| 2,602,822 | Schwarzer et al. | July 8, 1952 |
| 2,831,898 | Ecke | Apr. 22, 1958 |
| 2,884,462 | Henry | Apr. 28, 1959 |

OTHER REFERENCES

Nachod et al.: Ion Exchange Technology (1956), page 279.

Calmon et al.: Ion Exchangers in Organic and Biochemistry (1957), pp. 662–687.